US012187032B2

(12) United States Patent
Nishikawa

(10) Patent No.: US 12,187,032 B2
(45) Date of Patent: Jan. 7, 2025

(54) HEAD DEVICE, INK JET PRINTING DEVICE, AND DRIVING VOLTAGE ADJUSTMENT METHOD

(71) Applicant: FUJIFILM Corporation, Tokyo (JP)

(72) Inventor: Baku Nishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 116 days.

(21) Appl. No.: 18/059,568

(22) Filed: Nov. 29, 2022

(65) Prior Publication Data

US 2023/0097719 A1 Mar. 30, 2023

Related U.S. Application Data

(63) Continuation of application No. PCT/JP2021/020926, filed on Jun. 2, 2021.

(30) Foreign Application Priority Data

Jun. 12, 2020 (JP) ................................ 2020-102125

(51) Int. Cl.
*B41J 2/045* (2006.01)
*B41J 2/14* (2006.01)

(52) U.S. Cl.
CPC ....... *B41J 2/04581* (2013.01); *B41J 2/04541* (2013.01); *B41J 2/14233* (2013.01);
(Continued)

(58) Field of Classification Search
CPC .. B41J 2/04581; B41J 2/0458; B41J 2/04508; B41J 2/0459; B41J 2/04541;
(Continued)

(56) References Cited

U.S. PATENT DOCUMENTS

2007/0195120 A1 8/2007 Kim et al.
2008/0084442 A1 4/2008 Misumi
(Continued)

FOREIGN PATENT DOCUMENTS

JP H04-250054 A 9/1992
JP 2003-182056 A 7/2003
(Continued)

OTHER PUBLICATIONS

International Search Report issued in PCT/JP2021/020926; mailed Aug. 10, 2021.
(Continued)

*Primary Examiner* — Kristal Feggins
(74) *Attorney, Agent, or Firm* — Studebaker & Brackett PC

(57) ABSTRACT

Provided are a head device, an ink jet printing device, and a driving voltage adjustment method capable of adjusting a driving voltage corresponding to a target jetting amount and suppressing unevenness of printing density occurring between head modules. A dead device includes an ink jet head including a plurality of head modules, and a driving voltage supply device that includes a processor and supplies a driving voltage to the ink jet head, in which the processor acquires a module characteristic, acquires an ink characteristic of ink applied to printing, derives a first voltage coefficient for adjusting a driving voltage corresponding to a target jetting amount for each head module based on the module characteristic and the ink characteristic, and adjusts the driving voltage by applying the first voltage coefficient for each head module.

11 Claims, 13 Drawing Sheets

(52) U.S. Cl.
CPC ................. *B41J 2002/14258* (2013.01); *B41J 2002/14491* (2013.01)

(58) Field of Classification Search
CPC .......... B41J 2/14233; B41J 2002/14258; B41J 2002/14491; B41J 2/2128; B41J 2/2139; B41J 2/2146; B41J 2/2132; B41J 2025/008; B41J 2202/20; B41J 2/14201; B41J 2/14209; B41J 2/14274; B41J 2/14282; B41J 2/1429; B41J 2/14298
See application file for complete search history.

(56) References Cited

U.S. PATENT DOCUMENTS

| | | | |
|---|---|---|---|
| 2009/0213156 | A1 | 8/2009 | Okada et al. |
| 2010/0201726 | A1 | 8/2010 | Kondo et al. |
| 2013/0083109 | A1 | 4/2013 | Hibino |
| 2016/0167365 | A1 | 6/2016 | Hirabayashi |
| 2018/0250932 | A1 | 9/2018 | Mizutani |

FOREIGN PATENT DOCUMENTS

| | | | |
|---|---|---|---|
| JP | 2006-198902 | A | 8/2006 |
| JP | 2008-093853 | A | 4/2008 |
| JP | 2009-196276 | A | 9/2009 |
| JP | 2012-076376 | A | 4/2012 |
| JP | 6042295 | B2 | 12/2016 |
| JP | 6561645 | B2 | 8/2019 |
| JP | 2019-205974 | A | 12/2019 |
| JP | 2019-217649 | A | 12/2019 |
| WO | 2017/047448 | A1 | 3/2017 |

OTHER PUBLICATIONS

International Preliminary Report on Patentability (Chapter I) and Written Opinion of the International Searching Authority issued in PCT/JP2021/020926; issued Dec. 13, 2022.

The extended European search report issued by the European Patent Office on Oct. 10, 2023, which corresponds to European Patent Application 21820945.0-1014 and is related to U.S. Appl. No. 18/059,568.

FIG. 5

| HEAD MODULE | VOLTAGE COEFFICIENT [%] SHIPMENT INSPECTION VALUE | VOLTAGE COEFFICIENT [%] CORRECTION COEFFICIENT ADDITION |
|---|---|---|
| Module#1 | 101 | 104 |
| Module#2 | 105 | 108 |
| Module#3 | 95 | 98 |
| Module#4 | 99 | 102 |
| Module#5 | 110 | 113 |
| Module#6 | 100 | 103 |
| Module#7 | 102 | 105 |
| Module#8 | 98 | 101 |
| Module#9 | 106 | 109 |
| Module#10 | 97 | 100 |
| Module#11 | 125 | 129 |
| Module#12 | 113 | 116 |
| EXPRESSION | a | a + b |

FIG. 10

| HEAD MODULE | VOLTAGE COEFFICIENT [%] SHIPMENT INSPECTION VALUE | VOLTAGE COEFFICIENT [%] CORRECTION COEFFICIENT ADDITION | VOLTAGE COEFFICIENT [%] AFTER RELATIVE DENSITY ADJUSTMENT | VOLTAGE COEFFICIENT [%] AFTER AVERAGE VALUE ADJUSTMENT |
|---|---|---|---|---|
| Module#1 | 101 | 104 | 100 | 102 |
| Module#2 | 105 | 108 | 103 | 105 |
| Module#3 | 95 | 98 | 93 | 94 |
| Module#4 | 99 | 102 | 102 | 104 |
| Module#5 | 110 | 113 | 116 | 118 |
| Module#6 | 100 | 103 | 98 | 100 |
| Module#7 | 102 | 105 | 102 | 104 |
| Module#8 | 98 | 101 | 103 | 105 |
| Module#9 | 106 | 109 | 108 | 110 |
| Module#10 | 97 | 100 | 97 | 98 |
| Module#11 | 125 | 129 | 131 | 133 |
| Module#12 | 113 | 116 | 115 | 117 |
| Average | 104.3 | 107.4 | 105.7 | 107.4 |
| EXPRESSION | a | a*b | c | c*{Avg(a*b)/Avg(c)} |

HEAD DEVICE, INK JET PRINTING DEVICE, AND DRIVING VOLTAGE ADJUSTMENT METHOD

CROSS-REFERENCE TO RELATED APPLICATIONS

The present application is a Continuation of PCT International Application No. PCT/JP2021/020926 filed on Jun. 2, 2021 claiming priority under 35 U.S.C. § 119 (a) to Japanese Patent Application No. 2020-102125 filed on Jun. 12, 2020. Each of the above applications is hereby expressly incorporated by reference, in its entirety, into the present application.

BACKGROUND OF THE INVENTION

1. Field of the Invention

The present invention relates to a head device, an ink jet printing device, and a driving voltage adjustment method.

2. Description of the Related Art

In an ink jet printing device, it is generally required to suppress banding of an ink liquid droplet, such as flight banding, and white streaks and dark streaks due to jetting abnormality. In particular, in a case in which a head having a structure in which a plurality of head modules are connected in a medium width direction is provided and single-pass method printing is performed, it is generally required to make a jetting amount of ink liquid droplets for each head module uniform, and to suppress the banding occurring between the head modules.

In a case in which the jetting amount cannot be adjusted to a target jetting amount, problems, such as an increase in omissions in a printed image and jetting bending due to a decrease in a dot diameter, can occur in a case in which the jetting force is decreased. On the other hand, in a case in which the jetting force is increased, problems, such as bleeding and induction of sudden bending of the printed image due to an increase in the dot diameter, can occur.

Therefore, in the ink jet printing device, a driving voltage supplied to a pressure generation element, such as PZT, provided in the head is adjusted to adjust the jetting amount of ink liquid droplets for each head module. It should be noted that PZT represents lead zirconate titanate.

JP6042295B discloses an ink jet printing device including an ink jet head having a structure in which a plurality of head modules are connected in a medium width direction. The device disclosed in JP6042295B calculates an average value of density measurement values for each head module, and calculates an actual average jetting amount for each head module based on a correlation between an ink jetting amount and density. Then, each head module is supplied with a driving voltage adjusted such that the average jetting amount is a target average jetting amount.

JP2006-198902A discloses a printing system comprising an ink jet head in which a plurality of head modules are connected in a medium width direction. The system disclosed in JP2006-198902A determines a plurality of driving waveforms, selects the driving waveform in accordance with printing conditions, such as the number of gradations of printing, a printing resolution, and a printing environment, and suppresses a deterioration of an image quality due to a variation in jetting characteristics of a liquid droplet ejector.

JP2019-205974A discloses an ink jet printing device comprising an ink jet head. The device disclosed in JP2019-205974A optically detects a landing timing of a liquid droplet, calculates a flight speed of the liquid droplet, obtains a size of the liquid droplet using a correlation between the size of the liquid droplet and the flight speed of the liquid droplet, and corrects driving of a nozzle in a case in which the size of the liquid droplet is out of an allowable range.

JP6561645B discloses an ink jet printing device that corrects reference waveform data for detection in a case in which a residual vibration is detected, in accordance with a nozzle diameter for each nozzle, an electrostatic capacity of a piezoelectric element for each nozzle, and the like, and detects an abnormal state with high accuracy.

JP2019-217649A discloses an ink jet printing device that corrects a voltage amplitude of a driving voltage or an offset voltage in accordance with a temperature and the like of an ink jet head. JP2019-217649A discloses that a correction table or the like of the driving voltage for each type of ink is prepared, and the correction table or the like is switched in accordance with the ink to be used.

SUMMARY OF THE INVENTION

However, it is difficult to measure an actual jetting amount by using an ink jet printing device. In general, a driving voltage is defined based on a jetting amount measured during shipment inspection or a printing density of the ink jet printing device.

In a case in which the driving voltage based on the jetting amount measured during the shipment inspection is applied, there is a concern that the density unevenness of a printed image due to a difference in the types of ink occurs. Similarly, also in a case in which the driving voltage is adjusted based on the printing density, the printing density is changed depending on the types of ink applied to printing.

The device disclosed in JP6042295B calculates the ink jetting amount from a measurement value of the printing density for each head module by applying the correlation between a predefined ink jetting amount and the printing density, but the ink jetting amount that correlates with the measurement value of the printing density varies depending on the types of ink applied to printing.

JP2006-198902A includes the description regarding the variation of jetting characteristics for each liquid droplet ejector, but does not include the description or suggestion regarding the adjustment of the driving voltage for realizing the target jetting amount.

In the device disclosed in JP2019-205974A, a special device is required to actually measure the landing timing, and it is difficult to accurately measure the landing timing in the ink jet printing device. In addition, a certain delay period occurs between a jetting command signal and an actual jetting timing. Considering a device environment and the software that performs jetting control, it is difficult to match the jetting command signal with the actual jetting timing. As a result, it is difficult to measure the flight speed of the liquid droplet disclosed in JP2019-205974A.

The device disclosed in JP6561645B corrects the reference waveform for detection in accordance with the nozzle diameter for each nozzle, the electrostatic capacity of the piezoelectric element for each nozzle, and the like in a case in which the residual vibration is detected to detect a state of the nozzle. On the other hand, JP6561645B does not include the description regarding the adjustment of the driving voltage for realizing the target jetting amount.

JP2019-217649A describes that the driving voltage supplied to the piezoelectric element is corrected corresponding to a change in ink viscosity in accordance with the types of ink, and a certain ink jetting amount is realized without depending on a variation in the ink viscosity. On the other hand, JP2019-217649A does not include the description regarding the adjustment of the driving voltage for realizing the target jetting amount.

The present invention has been made in view of such circumstances, and is to provide a head device, an ink jet printing device, and a driving voltage adjustment method capable of adjusting a driving voltage corresponding to a target jetting amount and suppressing unevenness of printing density occurring between head modules.

In order to achieve the object described above, the following aspects of the invention are provided.

The present disclosure relates to a head device comprising an ink jet head including a plurality of head modules, and a driving voltage supply device that includes one or more processors and supplies a driving voltage to the ink jet head, in which the processor acquires a module characteristic that represents a characteristic for each head module, acquires an ink characteristic that represents a characteristic of ink applied to printing using the ink jet head, derives a first voltage coefficient for adjusting a driving voltage corresponding to a target jetting amount for each head module based on the module characteristic and the ink characteristic, and adjusts the driving voltage supplied to the ink jet head by applying the first voltage coefficient for each head module.

With the head device according to the present disclosure, the driving voltage corresponding to the target jetting amount is adjusted for each head module by applying the first voltage coefficient based on the module characteristic and the ink characteristic that represents the characteristic of the ink applied to printing. As a result, it is possible to suppress the occurrence of the density unevenness in the printed image due to a difference in the characteristic for each head module, for the ink applied to printing.

In the head device according to another aspect, the processor acquires a density measurement value of a printed image, which is printed by applying the driving voltage adjusted using the first voltage coefficient, for each head module, derives a second voltage coefficient for adjusting a driving voltage corresponding to a target density value for each head module based on a correlation between a voltage coefficient, which is predefined for each head module, and a density value of the printed image, and adjusts the driving voltage supplied to the ink jet head by applying the second voltage coefficient for each head module.

According to such an aspect, the density value of the printed image for each head module is matched to a relative target density value between the head modules. As a result, it is possible to suppress a variation in the density of the printed image for each head module.

In the head device according to still another aspect, in a case in which the second voltage coefficient for each head module is denoted by c, an average value of the first voltage coefficients of the plurality of head modules is denoted by Avg(a*b), and an average value of the second voltage coefficients of the plurality of head modules is denoted by Avg(c), the processor derives a third voltage coefficient represented by $c \times \{Avg(a*b)/Avg(c)\}$ for each head module, and adjusts the driving voltage supplied to the ink jet head by applying the third voltage coefficient for each head module.

According to such an aspect, for the average value of the second voltage coefficients in the plurality of head modules, the average value of the first voltage coefficients in the plurality of head modules is maintained, and the third voltage coefficient is derived. As a result, it is possible to match the density value of the printed image for each head module with the target density value.

In the head device according to still another aspect, the processor acquires information on a medium applied to printing, and corrects the third voltage coefficient in accordance with the acquired information on the medium.

According to such an aspect, the third voltage coefficient is corrected in accordance with the medium applied to printing. As a result, the target density value can be realized in the printed image regardless of the difference in the medium.

In the head device according to still another aspect, the processor acquires, as the module characteristic, an initial voltage coefficient applied to adjustment of the driving voltage corresponding to the target jetting amount in a case in which defined ink is applied.

According to such an aspect, the initial voltage coefficient corresponding to the jetting characteristic for each head module can be acquired for each head module.

In the head device according to still another aspect, the processor acquires, as the module characteristic, an initial voltage coefficient derived based on a characteristic of a pressure generation element that generates a pressure for jetting ink from the ink jet head, the initial voltage coefficient being applied to adjustment of the driving voltage corresponding to the target jetting amount.

According to such an aspect, it is possible to acquire the initial voltage coefficient based on the characteristic of the pressure generation element in a case in which it is difficult to measure the jetting amount of ink applied to printing.

As the characteristic of the pressure generation element, an electrical characteristic may be applied, or a mechanical characteristic may be applied.

In the head device according to still another aspect, the processor acquires, as the module characteristic, an initial voltage coefficient derived based on a measurement value of a component of a printed image to which defined ink is applied, the initial voltage coefficient being applied to adjustment of the driving voltage corresponding to the target jetting amount.

According to such an aspect, even in a case in which it is difficult to measure the jetting amount, it is possible to acquire the initial voltage coefficient based on the measurement value of the component of the printed image that reflects the jetting characteristic of the head module.

A dot, which is the minimum constitutional unit of the printed image, can applied to the component of the printed image. A dot group composed of a plurality of dots can be applied to the component of the printed image.

In the head device according to still another aspect, the processor acquires, as the ink characteristic, viscosity of the ink applied to printing.

According to such an aspect, the driving voltage corresponding to the target jetting amount can be adjusted in accordance with a difference in viscosity between the ink used for deriving the module characteristic and the ink applied to printing.

In the head device according to still another aspect, the processor acquires, as the ink characteristic, a ratio between a voltage coefficient derived based on a result of measurement of a jetting amount of the ink applied to printing and a voltage coefficient derived based on a result of measurement of a jetting amount of defined ink.

According to such an aspect, the driving voltage corresponding to the target jetting amount can be adjusted in accordance with a variation in the jetting amount between the ink used for deriving the module characteristic and the ink applied to printing.

The present disclosure relates to an ink jet printing device comprising an ink jet head including a plurality of head modules, and a driving voltage supply device that includes one or more processors and supplies a driving voltage to the ink jet head, in which the processor acquires a module characteristic that represents a characteristic for each head module, acquires an ink characteristic that represents a characteristic of ink applied to printing using the ink jet head, derives a first voltage coefficient for adjusting a driving voltage corresponding to a target jetting amount for each head module based on the module characteristic and the ink characteristic, and adjusts the driving voltage supplied to the ink jet head by applying the first voltage coefficient for each head module.

The present disclosure relates to a driving voltage adjustment method of adjusting a driving voltage applied to an ink jet head including a plurality of head modules, the method comprising acquiring a module characteristic that represents a characteristic for each head module, acquiring an ink characteristic that represents a characteristic of ink applied to printing using the ink jet head, deriving a first voltage coefficient for adjusting a driving voltage corresponding to a target jetting amount for each head module based on the module characteristic and the ink characteristic, and adjusting the driving voltage supplied to the ink jet head by applying the first voltage coefficient for each head module.

According to the present invention, the driving voltage corresponding to the target jetting amount is adjusted for each head module by applying the first voltage coefficient based on the module characteristic and the ink characteristic that represents the characteristic of the ink applied to printing. As a result, it is possible to suppress the occurrence of the density unevenness in the printed image due to a difference in the characteristic for each head module, for the ink applied to printing.

BRIEF DESCRIPTION OF THE DRAWINGS

FIG. 5 is a table showing an example of a voltage coefficient applied to a driving voltage adjustment method according to the first embodiment.

FIG. 10 is a table showing an example of a voltage coefficient applied to a driving voltage adjustment method according to the second embodiment.

DESCRIPTION OF THE PREFERRED EMBODIMENTS

Figure 1:
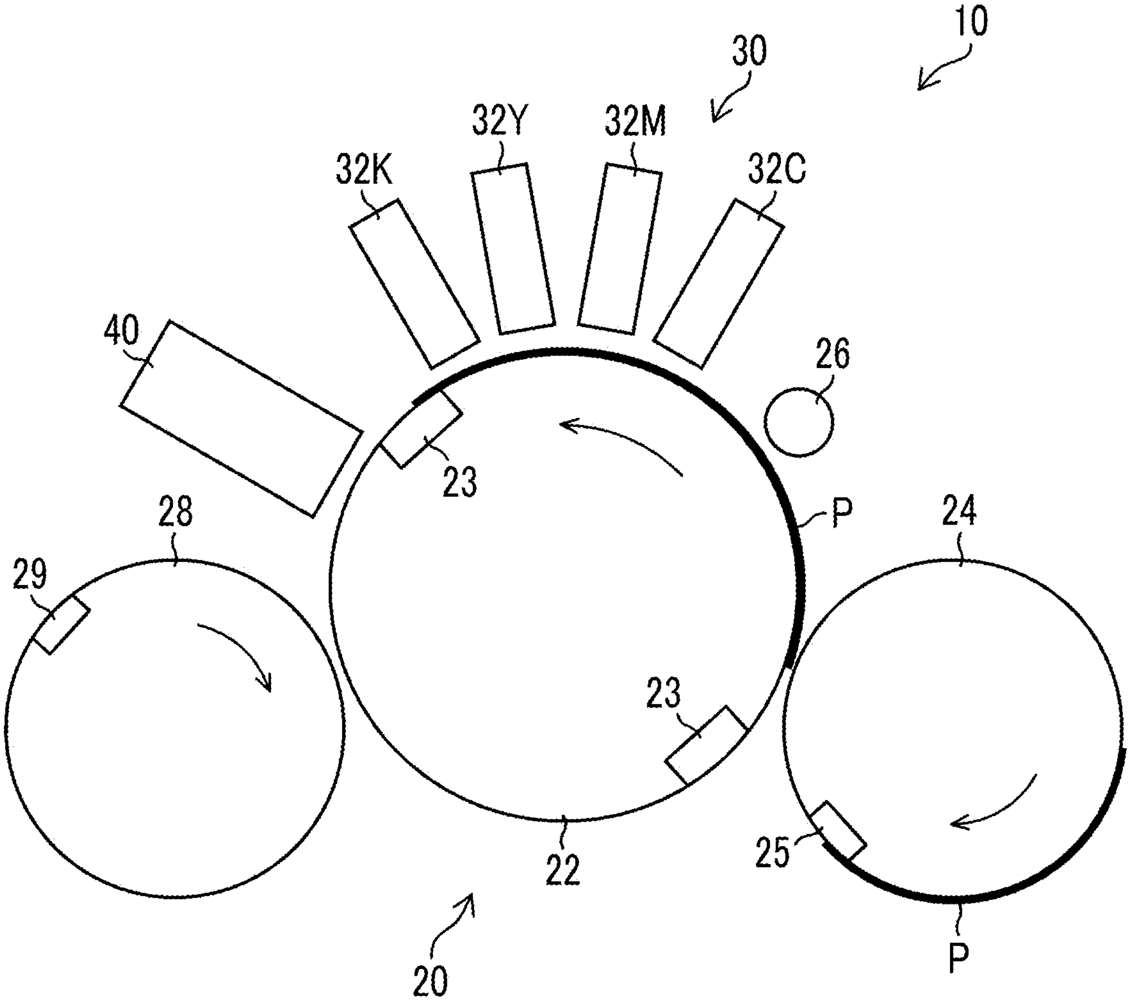
FIG. 1 is an overall configuration diagram of an ink jet printing device according to a first embodiment.

In the following, embodiments of the present invention will be described in detail with reference to the accompanying drawings. In the present specification, the same reference numerals will be given to the same components and repetitive description thereof will be appropriately omitted.

First Embodiment

[Overall Configuration of Ink Jet Printing Device]

FIG. 1 is an overall configuration diagram of an ink jet printing device according to a first embodiment. An ink jet printing device 10 is a printing device to which an ink jet method for printing an image on paper P by a single-pass method is applied.

FIG. 1 shows a sheet of the paper P. Continuous paper may be applied to the paper P. Paper, cloth, resin, metal, and the like can be applied to a material of the paper P. Any of a permeation medium or a non-permeation medium may be applied to the paper P.

The ink jet printing device 10 comprises a transport device 20, a jetting device 30, and an in-line sensor 40. The ink jet printing device 10 may comprise components not shown in FIG. 1, such as a paper feed device, an ink dry device, and a stacking device.

The transport device 20 comprises a jetting drum 22, a paper feed drum 24, a paper pressing roller 26, and a paper ejection drum 28. The transport device 20 transports the paper P along a defined paper transport direction.

An arrow line given to the jetting drum 22 indicates the paper transport direction on the jetting drum 22. Similarly, an arrow line given to the paper feed drum 24 indicates the paper transport direction in the paper feed drum 24. An arrow line given to the paper ejection drum 28 indicates the paper transport direction in the paper ejection drum 28. It should be noted that the paper transport direction described in the embodiment is an example of a medium transport direction.

The jetting drum 22 is a drum having a cylindrical shape. A total length of the jetting drum 22 in an axial direction parallel to the rotation shaft exceeds a total length of the paper P having the maximum size in a paper width direction.

The configuration described above also applies to the paper feed drum 24 and the paper ejection drum 28. It should be noted that the paper width direction is a direction orthogonal to the paper transport direction. The paper width direction described in the embodiment is an example of a medium width direction.

Here, the term parallel in the present specification can include substantially parallel, which can achieve the same action and effect as two directions in which two intersecting directions are parallel. In addition, the term orthogonal can include substantially orthogonal, which can achieve the same action and effect as two directions in which two intersecting directions at an angle exceeding 90 degrees or an angle less than 90 degrees are orthogonal to each other.

The jetting drum 22 supports the paper P by an outer peripheral surface thereof. For example, as an example of an aspect in which the paper P is supported by the outer peripheral surface of the jetting drum 22, there is an aspect in which a suction pressure is generated in a plurality of suction holes provided on the outer peripheral surface and the suction pressure is added to the paper P.

The jetting drum 22 comprises two grippers 23. The gripper 23 grips a leading end portion of the paper P. The two grippers 23 are disposed at positions deviating by a distance corresponding to 180 degrees in a rotation direction of the jetting drum 22.

The gripper 23 comprises a plurality of gripping claws and a support member. The plurality of gripping claws are disposed along the rotation shaft of the jetting drum 22. The plurality of gripping claws are supported to be openable and closable by the support member. It should be noted that the gripping claws and the support member are not shown.

The jetting drum 22 is supported to be rotatable around the rotation shaft. The rotation shaft of the jetting drum 22 is connected to a driving device comprising a motor, a driving mechanism, and the like. The jetting drum 22 is rotated in a defined rotation direction in response to an operation of the driving device. It should be noted that the driving device comprising the motor, the driving mechanism, and the like is not shown.

The jetting drum 22 supports the paper P by the outer peripheral surface thereof and is rotated around the rotation shaft. As a result, the paper P is transported in the paper transport direction along the outer peripheral surface of the jetting drum 22.

The paper feed drum 24 comprises one gripper 25. It is possible to apply a structure similar to gripper 23 to the gripper 25. The paper feed drum 24 is connected to a driving device having the same configuration as the driving device provided in the jetting drum 22. The paper feed drum 24 is rotated around the rotation shaft.

The paper P of which the leading end portion is gripped by the gripper 25 is transported in the paper transport direction along the outer peripheral surface of the paper feed drum 24. The gripper 25 delivers the paper P to the gripper 23 at a medium delivery position.

The paper pressing roller 26 has a cylindrical shape. A total length of the paper pressing roller 26 in the axial direction of the jetting drum 22 exceeds the total length of the paper P having the maximum size in the paper width direction. The paper pressing roller 26 is supported to be rotatable around the rotation shaft.

The paper pressing roller 26 is connected to a pressing mechanism which presses the paper P toward the outer peripheral surface of the jetting drum 22. The paper pressing roller 26 presses the paper P toward the outer peripheral surface of the jetting drum 22 to bring the paper P into close contact with the outer peripheral surface of the jetting drum 22.

The paper ejection drum 28 comprises one gripper 29. It is possible to apply a structure similar to gripper 23 to the gripper 29. The paper P is delivered to the gripper 29 from the gripper 23 at the medium delivery position.

The paper ejection drum 28 is connected to a driving device having the same configuration as the driving device provided in the jetting drum 22. The paper ejection drum 28 is rotated around the rotation shaft. The paper P of which the leading end portion is gripped by the gripper 29 is transported in the paper transport direction along the outer peripheral surface of the paper ejection drum 28. It should be noted that the rotation shaft of the jetting drum 22, the rotation shaft of the paper feed drum 24, the rotation shaft of the paper ejection drum 28, and the medium delivery position are not shown.

The jetting device 30 comprises an ink jet head 32C, an ink jet head 32M, an ink jet head 32Y and an ink jet head 32K. The ink jet head 32C, the ink jet head 32M, the ink jet head 32Y, and the ink jet head 32K are disposed at positions facing the outer peripheral surface of the jetting drum 22.

The ink jet head 32C, the ink jet head 32M, the ink jet head 32Y, and the ink jet head 32K are disposed at equal intervals along the outer peripheral surface of the jetting drum 22.

In the following, the ink jet head 32C, the ink jet head 32M, the ink jet head 32Y, and the ink jet head 32K may be collectively referred to as the ink jet head 32.

The ink jet head 32C, the ink jet head 32M, the ink jet head 32Y, and the ink jet head 32K are print heads that jet aqueous inks of cyan, magenta, yellow, and black, respectively.

The aqueous ink refers to ink obtained by dissolving or dispersing a coloring material, such as a dye and a pigment, in water and a water-soluble solvent. It should be noted that, for the ink jet head 32, a type of ink other than the aqueous ink, such as ink containing an organic solvent, can be applied.

The ink is supplied to each of the ink jet heads 32 from ink tanks of corresponding colors via a pipe path. It should be noted that the ink tank and the pipe path are not shown.

The ink jet head 32 is a line-type head capable of performing single-pass method printing in which printing is performed by scanning the paper P supported by the outer peripheral surface of the jetting drum 22 once. A serial type head may be applied to the ink jet heads 32. A plurality of nozzles that jet the ink are formed in a nozzle surface of the ink jet head 32. A two-dimensional disposition can be applied to the plurality of nozzles. A matrix disposition can be applied to the two-dimensional disposition of the plurality of nozzles. In addition, a water-repellent film is formed on the nozzle surface of the ink jet head 32.

Figure 2:
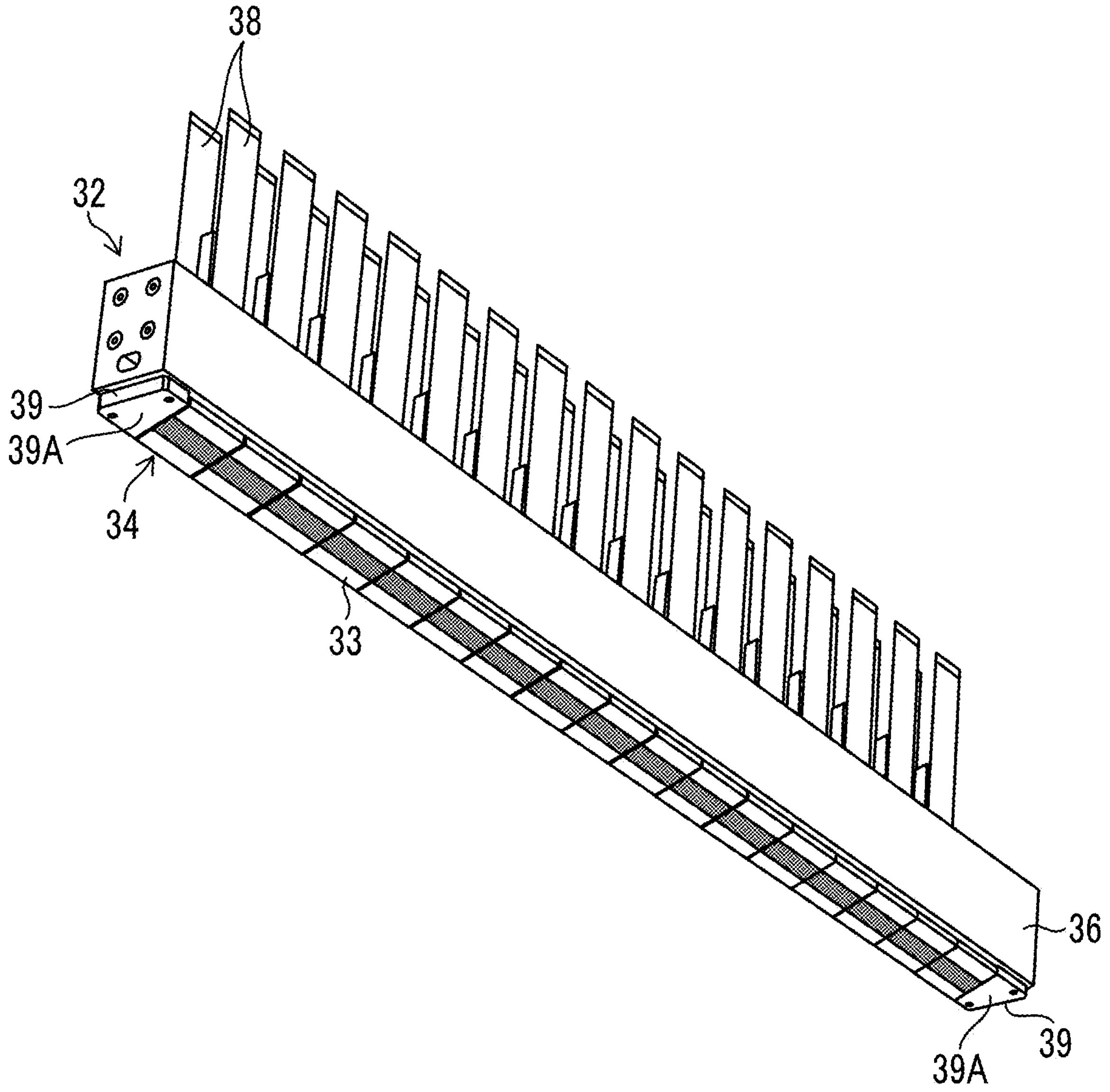
FIG. 2 is a perspective view showing a configuration example of an ink jet head.

The ink jet head 32 can be configured by connecting a plurality of head modules to each other in the paper width direction. It should be noted that the head module, the nozzle, and the water-repellent film are not shown. The nozzle surface is shown in FIG. 2 using reference numeral 33.

Ink liquid droplets are jetted from the ink jet head 32 toward a printing surface of the paper P. The ink liquid droplets jetted from the ink jet head 32 adhere to the paper P, and an image is printed on the printing surface of the paper P.

In the present embodiment, the aspect has been described in which four color inks of cyan, magenta, yellow, and black are used, but the ink color and the number of colors are not limited to the present embodiment. For example, an aspect using light color inks, such as light magenta and light cyan, and an aspect using special color inks, such as green, orange, violet, white, clear, and metallic inks, may be applied.

In addition, a plurality of ink jet heads 32 that jet the ink of the same color may be disposed. The disposition order of the ink jet heads 32 for each color is also not limited to the aspect shown in FIG. 1.

The jetting device 30 prints a test image, such as a density measurement chart, on the printing surface of the paper P. The in-line sensor 40 reads the test image printed on the printing surface of the paper P and outputs the read data of the test image. The ink jet printing device 10 analyzes the read data of the test image and performs various pieces of processing, such as correction of the ink jet head 32 based on an analysis result.

The in-line sensor 40 comprises an imaging apparatus including a CCD image sensor. A line sensor in which a plurality of photoelectric conversion elements are arranged in a line can be applied to the CCD image sensor. An area sensor in which a plurality of photoelectric conversion elements are two-dimensionally disposed may be applied to the CCD image sensor. The CCD is an abbreviation of a charge coupled device.

As the imaging apparatus, an aspect having an imaging range corresponding to the entire width of the image printed on the printing surface of the paper P may be applied, or an aspect of performing scanning along the paper width direction to read the entire width of the image printed on the printing surface of the paper P may be applied.

[Configuration Example of Ink Jet Head]

FIG. 2 is a perspective view showing a configuration example of the ink jet head. The ink jet head 32 has a structure in which a plurality of head modules 34 are connected to each other along a longitudinal direction. The plurality of head modules 34 are integrally supported by a support frame 36.

Two flexible substrates 38 are connected to each head module 34. The flexible substrate 38 is formed with an electrical wiring line for transmitting the driving voltage supplied to a jetting element provided in the head module 34.

The jetting element comprises a nozzle opening, a flow passage communicating with the nozzle opening, and a pressure generation element. The pressure generation element adds a jetting pressure to the ink to be jetted from the nozzle opening. A piezoelectric element can be applied to the pressure generation element. For the head module 34, a piezoelectric method in which the ink liquid droplets are jetted from the nozzle opening in accordance with bending deformation of the piezoelectric element can be applied.

A heating element can be applied to the pressure generation element. For the head module 34, a thermal method in which the ink liquid droplets are jetted from the nozzle opening using a film boiling phenomenon of the ink may be applied. It should be noted that the jetting element, the nozzle opening, the flow passage, and the pressure generation element are not shown.

The nozzle surface 33 of the head module 34 has a parallelogram shape. Dummy plates 39 are attached to both ends of the support frame 36. The nozzle surface 33 of the head module 34 has a rectangular shape as a whole together with a surface 39A of the dummy plate 39.

[Functional Blocks of Ink Jet Printing Device]

Figure 3:
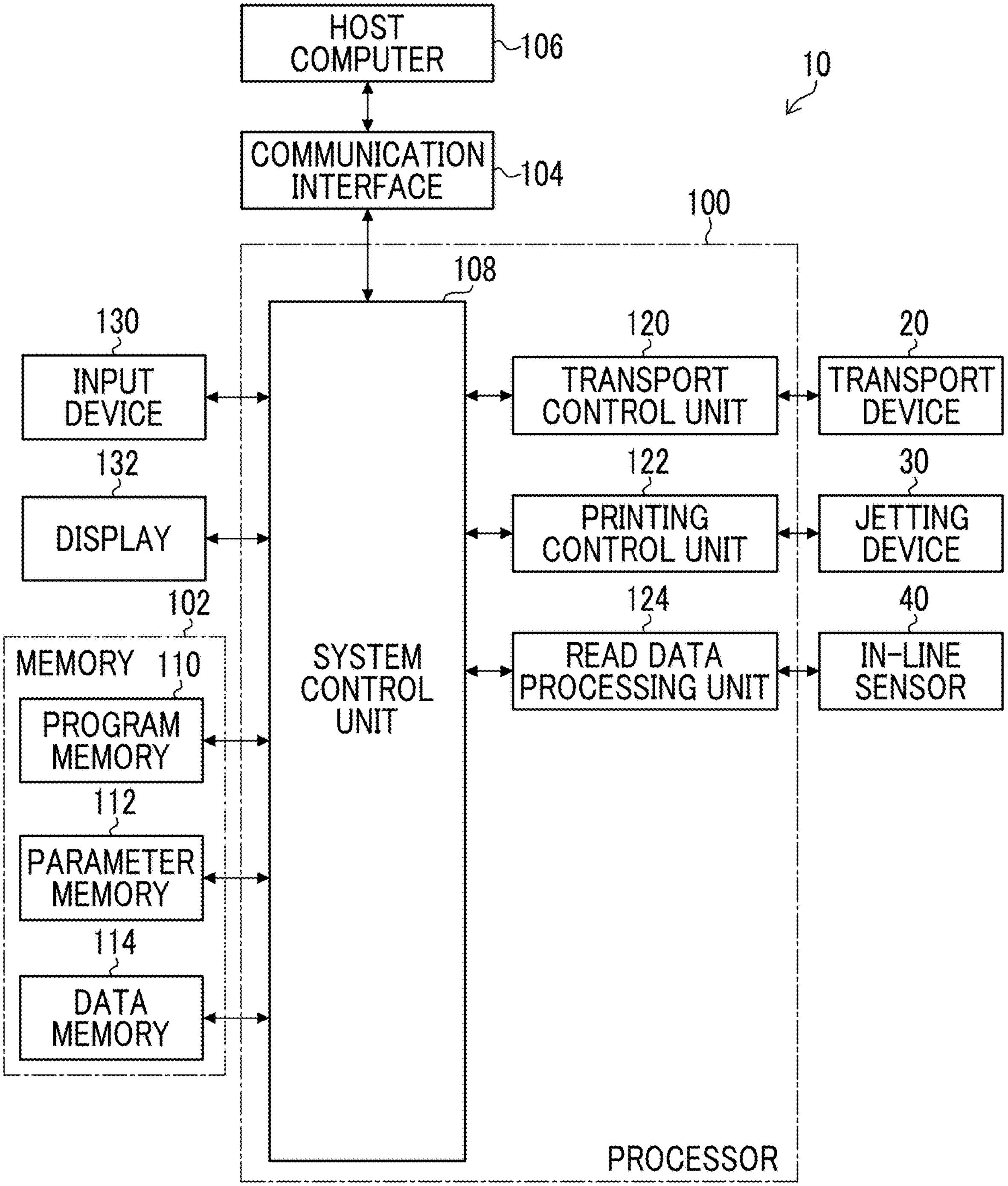
FIG. 3 is a functional block diagram of the ink jet printing device shown in FIG. 1.

FIG. 3 is a functional block diagram of the ink jet printing device shown in FIG. 1. The ink jet printing device 10 comprises one or more processors 100 and one or more memories 102. In addition, the ink jet printing device 10 comprises a communication interface 104.

For the communication interface 104, any of a wired type or a wireless type may be applied. The ink jet printing device 10 acquires print data and the like from an external device, such as a host computer 106, via the communication interface 104.

The memory 102 comprises a program memory 110, a parameter memory 112, and a data memory 114. The program memory 110 stores various programs including instructions that can be executed by using the processor 100. The parameter memory 112 stores various parameters necessary for program execution. The data memory 114 stores various data. The data memory 114 may include a transitory storage region for various data.

The memory 102 can include a tangible computer-readable medium, such as a semiconductor memory. The memory 102 may include a magnetic storage device, such as a hard disk. The memory 102 can be composed of a plurality of storage devices and the like. The plurality of storage devices and the like can include a plurality of different types of storage devices and the like. The storage device and the like constituting the memory 102 may be divided into a plurality of storage regions.

The processor 100 executes the program stored in the program memory 110 to realize various functions of the ink jet printing device 10. Various processing units shown as the components of the processor 100 correspond to various functions of the ink jet printing device 10.

The system control unit 108 executes the program stored in the program memory 110, performs various pieces of processing of the ink jet printing device 10, and performs overall control of the ink jet printing device 10.

The transport control unit 120 controls an operation of the transport device 20. That is, the transport control unit 120 controls the feeding of the paper P and a transport speed of the paper P. It should be noted that the term speed in the present specification can include the meaning of the speed represented using an absolute value of speed.

A printing control unit 122 controls an ink jetting operation of the ink jet head 32 based on the print data. The printing control unit 122 performs image processing, such as various pieces of conversion processing, various pieces of correction processing, and pieces of halftone processing on the print data. The conversion processing includes conversion of the number of pixels, gradation conversion, color conversion, and the like. The correction processing includes density unevenness correction and non-jetting correction for suppressing the visibility of an image defect due to occurrence of a non-jetting nozzle.

The printing control unit 122 jets water the liquid droplets of the aqueous ink of each color toward the paper P from the ink jet head 32 of each color at a timing when the paper P passes a position facing the nozzle surface of the ink jet head 32.

A read data processing unit 124 acquires the read data, such as the test image, output from the in-line sensor 40 and analyzes the acquired read data. The system control unit 108 corrects the ink jet head 32 and the like based on the analysis result.

The ink jet printing device 10 comprises an input device 130. The processor 100 acquires an input signal output by the input device 130. Various operation members, such as an operation panel, a keyboard, a mouse, a touch panel, and a trackball, which receive input from a user can be applied to the input device 130. The input device 130 may be an appropriate combination thereof.

The ink jet printing device 10 comprises a display 132. The processor 100 transmits a display signal to display 132. The display 132 displays information based on the acquired display signal. Status information of the ink jet printing device 10, setting information of various parameters, error information of the ink jet printing device 10, or the like can be applied to the information displayed using the display 132.

The ink jet printing device 10 can comprise a touch panel type display, and the input device 130 and the display 132 can be integrated.

[Detailed Description of Printing Control Unit]

Figure 4:
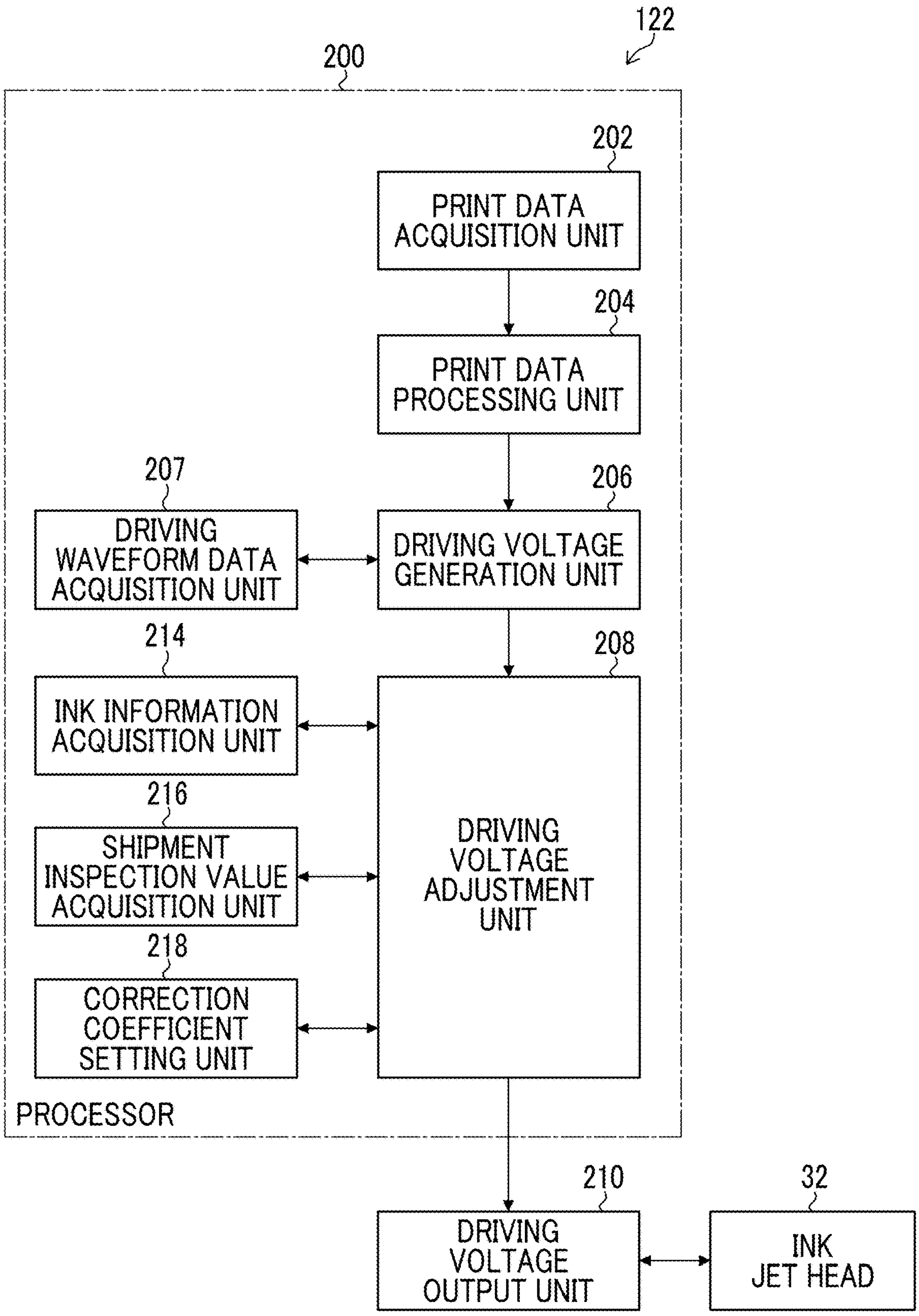
FIG. 4 is a functional block diagram showing a printing control unit shown in FIG. 3.

FIG. 4 is a functional block diagram showing the printing control unit shown in FIG. 3. The printing control unit 122 comprises a processor 200. It should be noted that the processor 200 may be configured as a part of the processor 100 shown in FIG. 3 or may be configured separately from the processor 100.

Various processing units of the printing control unit 122 shown as the components of the processor 200 correspond to various functions of the printing control unit 122. The processor 200 executes the program stored in the program memory 110 and realizes various functions related to printing control.

The printing control unit 122 comprises a print data acquisition unit 202. The print data acquisition unit 202 acquires the print data from the host computer 106 shown in FIG. 3. The print data acquisition unit 202 stores the acquired print data in the data memory 114 or the like shown in FIG. 3.

The printing control unit 122 comprises a print data processing unit 204. The print data processing unit 204 performs processing, such as various pieces of conversion processing, various pieces of correction processing, and pieces of halftone processing on the print data to generate a halftone image for each ink color.

The printing control unit 122 comprises a driving voltage generation unit 206. The driving voltage generation unit 206 generates the driving voltage supplied to the ink jet head 32 based on the halftone image. The driving voltage generation unit 206 acquires the driving waveform applied to the driving voltage via a driving waveform data acquisition unit 207. Acquisition includes an aspect of reading out acquisition target data from a memory in which the acquisition target data is stored. Acquisition can include an aspect of generating the acquisition target data.

The driving voltage generation unit 206 defines a correlation between the driving voltage and the jetting amount. The driving voltage in the correlation between the driving voltage and the jetting amount is a potential difference between the maximum potential and the reference potential. For example, the driving voltage is a height at which the driving waveform is triangular or trapezoidal. A table format or the like is applied to the correlation between the driving voltage and the jetting amount, and is stored.

The printing control unit 122 comprises a driving voltage adjustment unit 208. The driving voltage adjustment unit 208 adjusts the driving voltage supplied to the ink jet head 32 for each head module 34 shown in FIG. 2.

That is, the printing control unit 122 sets the correlation between the driving voltage and the jetting amount for each head module 34. A common driving voltage for each head module 34 is supplied to a plurality of pressure generation elements provided in the head module 34.

The printing control unit 122 comprises a driving voltage output unit 210. An electric circuit that power-amplifies the driving voltage is applied to the driving voltage output unit 210. The driving voltage output from the driving voltage output unit 210 is supplied to the ink jet head 32.

The ink jet head 32 jets the ink liquid droplets toward the paper P from the nozzle opening in accordance with the driving voltage output from the driving voltage output unit 210. A color image is printed on the paper P.

The printing control unit 122 comprises an ink information acquisition unit 214. The ink information acquisition unit 214 acquires ink identification information for identifying the ink applied to printing. The ink information acquisition unit 214 acquires ink characteristic information that represents an ink characteristic corresponding to the ink identification information.

As the ink identification information, a product name and a model that represents the type of ink are applied. Examples of the ink characteristic information include a rate of change of a voltage coefficient derived from a measurement result of the jetting amount measurement in the shipment inspection. Other examples of the ink characteristic information include a ratio between the viscosity of the ink applied to printing and the viscosity of ink applied to the shipment inspection. The jetting amount is a volume of the ink liquid droplet jetted in a unit period.

The voltage coefficient is applied to correct the correlation between the driving voltage and the jetting amount. In the ink jet printing device 10, the driving voltage corresponding to a target jetting amount is defined based on the correlation between the driving voltage and the jetting amount.

On the other hand, even in a case in which the defined driving voltage corresponding to the target jetting amount is applied, an actual jetting amount can be excessive or insufficient with respect to the target jetting amount due to the jetting characteristic for each head module 34. Therefore, the voltage coefficient is set for each head module 34 to adjust the driving voltage corresponding to the target jetting amount. It should be noted that the target jetting amount means a designed jetting amount corresponding to any driving voltage.

The printing control unit 122 comprises a shipment inspection value acquisition unit 216. The shipment inspection includes an inspection of the jetting characteristic for each head module 34 in the ink jet head 32. In the shipment inspection, a shipment inspection value is derived for a defined inspection item. The shipment inspection value is stored in the memory 102 shown in FIG. 3.

Examples of the shipment inspection value include the voltage coefficient in the ink applied to shipment inspection. An aspect in which a reference is 100%, a value exceeding 100% represents an increase in the driving voltage, and a value less than 100% represents a decrease in the driving voltage can be applied to the voltage coefficient.

The voltage coefficient can be derived based on a result of the jetting amount measurement. The voltage coefficient can be derived based on the electrical characteristic, such as the electrostatic capacity of the piezoelectric element, and the mechanical characteristic, such as an amount of displacement of the piezoelectric element. The voltage coefficient is increased in accordance with an increase in an electrical characteristic value of the piezoelectric element and a mechanical characteristic value of the piezoelectric element. The voltage coefficient is decreased in accordance with the decrease of the electrical characteristic value of the piezoelectric element and the mechanical characteristic value of the piezoelectric element.

The voltage coefficient can be derived based on a density measurement value of the printed image and a measurement value of the component of the printed image. Examples of the measurement value of the component of the printed image include a width of a line that constitutes the printed image and a diameter of a dot that constitutes the printed image. The jetting amount can be derived based on the measurement value in the printed image, and the voltage coefficient can be derived based on the derived jetting amount.

It should be noted that the voltage coefficient of the shipment inspection value described in the embodiment is an example of a module characteristic and an example of an initial voltage coefficient.

The printing control unit 122 comprises a correction coefficient setting unit 218. The correction coefficient setting unit 218 derives a voltage correction amount derived during the shipment inspection, and a correction coefficient that is a rate at which a voltage correction value varies in a case in which the ink applied to printing is used.

The correction coefficient setting unit 218 sets the correction coefficient applied to correct the voltage coefficient due to the difference in the ink. A ratio between the voltage coefficient derived using the jetting amount measurement value of the ink applied to printing and the voltage coefficient obtained as the shipment inspection value can be applied to the correction coefficient. The jetting amount measurement value of the ink applied to printing can be acquired before printing by a device other than the ink jet printing device 10, such as an inspection device.

The correction coefficient can be derived based on the viscosity of the ink applied to printing. There is concern that the accuracy of the correction coefficient derived based on the viscosity of the ink is less than that of the correction coefficient derived based on the result of the jetting amount measurement, but it is effective in a case in which the correction coefficient cannot be acquired before printing.

The driving voltage adjustment unit 208 corrects the voltage coefficient for each head module 34 by applying the correction coefficient in the ink applied to printing to the voltage coefficient acquired as the shipment inspection value.

As the correction coefficient, a ratio between the voltage coefficient of the ink applied to printing and the voltage coefficient of the shipment inspection value may be applied, and a difference between the voltage coefficient in the ink applied to printing and the voltage coefficient of the shipment inspection value may be applied.

The driving voltage adjustment unit 208 adjusts the driving voltage by applying the voltage coefficient corrected in accordance with the ink applied to printing. The driving voltage output unit 210 outputs the driving voltage adjusted in accordance with the ink applied to printing. It should be noted that the printing control unit 122 described in the embodiment is an example of a driving voltage supply device.

FIG. 5 is a table showing an example of a voltage coefficient applied to a driving voltage adjustment method according to the first embodiment. The voltage coefficient shown in FIG. 5 is represented by applying percentages based on 100. A voltage coefficient a is the shipment inspection value. A correction coefficient b represents the difference between the voltage coefficient in the ink applied to printing and the voltage coefficient of the shipment inspection value.

The ratio between the voltage coefficient in the ink applied to printing and the voltage coefficient of the shipment inspection value may be applied to the correction coefficient b. The voltage coefficient in the ink applied to printing is represented by a*b. * represents a difference or a ratio.

For example, in the head module 34 described as Module #1, in a case in which the voltage coefficient corrected based on the ink characteristic applied to printing is applied, the driving voltage corresponding to the target jetting amount is adjusted to 104% with respect to the designed driving voltage. It should be noted that the voltage coefficient in the ink applied to printing described in the embodiment is an example of a first voltage coefficient.

[Hardware Configurations of Each Processing Unit and Control Unit]

Various processors can be applied to the hardware of a processing unit that performs the various pieces of processing shown in FIGS. 3 and 4. It should be noted that the processing unit may be referred to as a processing unit. The various processors include a central processing unit (CPU), a programmable logic device (PLD), an application specific integrated circuit (ASIC), and the like.

The CPU is a general-purpose processor that executes the program to function as various processing units. The PLD is a processor of which a circuit configuration can be changed after manufacturing. Examples of the PLD include a field programmable gate array (FPGA). The ASIC is a dedicated electric circuit having a circuit configuration specifically designed to perform specific processing.

One processing unit may be composed of one of these various processors, or may be composed of two or more processors of the same type or different types. For example, one processing unit may be composed of a plurality of FPGAs and the like. One processing unit may be composed of a combination of one or more FPGAs and one or more CPUs.

In addition, a plurality of processing units may be composed of one processor. As an example in which the plurality of processing units are composed of one processor, there is a form in which one processor is composed of the combination of one or more CPUs and software, and one processor functions as the plurality of processing units. Such a form is represented by a computer, such as a client terminal device and a server device.

As another configuration example, there is a form in which a processor that realizes entire functions of a system including the plurality of processing units using one IC chip is used. Such a form is represented by a system on chip. It should be noted that IC is an abbreviation of an integrated circuit. In addition, the system on chip may be described as SoC using an abbreviation of system on chip.

As described above, the various processing units are composed of one or more of the various processors described above as the hardware structure. Further, more specifically, the hardware structure of the various processors is an electric circuit (circuitry) in which circuit elements, such as semiconductor elements, are combined.

[Procedure of Driving Voltage Adjustment Method]

Figure 6:
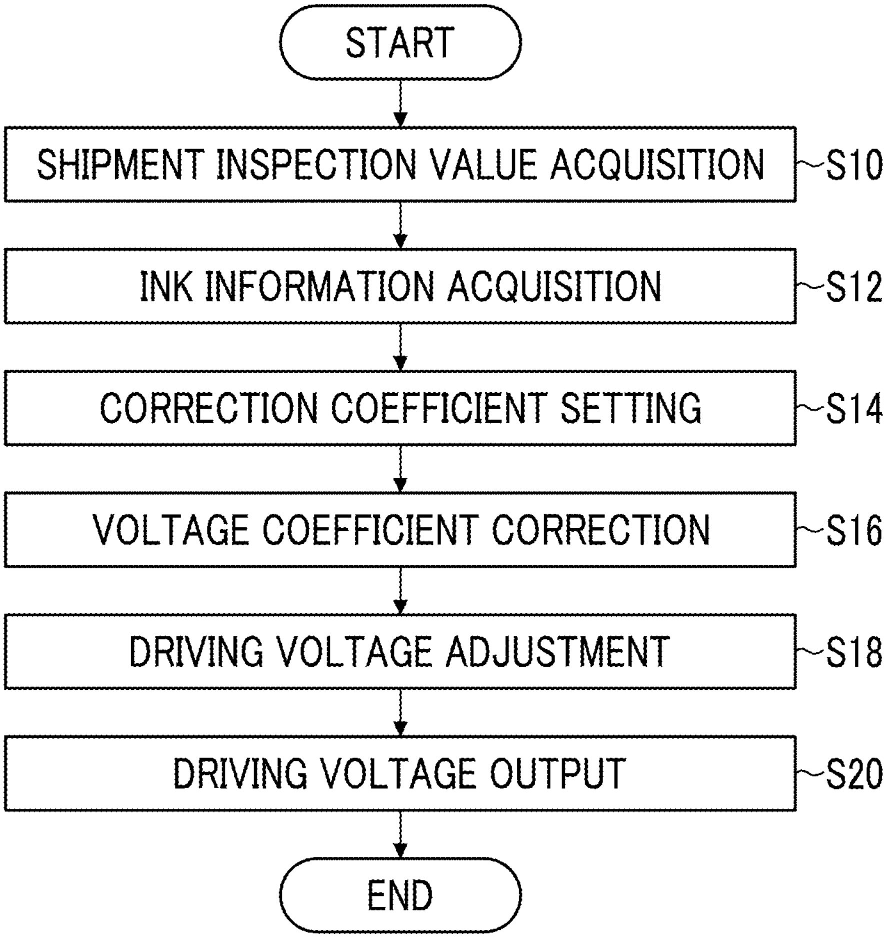
FIG. 6 is a flowchart showing a procedure of the driving voltage adjustment method according to the first embodiment.

FIG. 6 is a flowchart showing a procedure of the driving voltage adjustment method according to the first embodiment. In shipment inspection value acquisition step S10, the shipment inspection value acquisition unit 216 shown in FIG. 3 acquires the shipment inspection value for each head module 34. The shipment inspection value may be acquired from an external device or the like via the communication interface 104 shown in FIG. 2, or the shipment inspection value stored inside the ink jet printing device 10 may be read out. After shipment inspection value acquisition step S10, the processing proceeds to ink information acquisition step S12.

In ink information acquisition step S12, the ink information acquisition unit 214 acquires the ink characteristic information that represents the ink characteristic of the ink applied to printing. After ink information acquisition step S12, the processing proceeds to correction coefficient setting step S14.

In correction coefficient setting step S14, the correction coefficient setting unit 218 sets the correction coefficient in accordance with the ink applied to printing. Correction coefficient setting step S14 can include a correction coefficient acquisition step of acquiring the correction coefficient. Correction coefficient setting step S14 can include a correction coefficient derivation step of deriving the correction coefficient. After correction coefficient setting step S14, the processing proceeds to voltage coefficient correction step S16.

In voltage coefficient correction step S16, the driving voltage adjustment unit 208 corrects the voltage coefficient of the shipment inspection value by applying the correction coefficient corresponding to the ink applied to printing, and derives the voltage coefficient corresponding to the ink applied to printing. After voltage coefficient correction step S16, the processing proceeds to driving voltage adjustment step S18.

In driving voltage adjustment step S18, the driving voltage adjustment unit 208 adjusts the driving voltage for each head module 34 by applying the voltage coefficient corresponding to the ink applied to printing for each head module 34. After driving voltage adjustment step S18, the processing proceeds to driving voltage output step S20.

In driving voltage output step S20, the driving voltage output unit 210 outputs the driving voltage adjusted for each head module 34 in driving voltage adjustment step S18.

Figure 7:
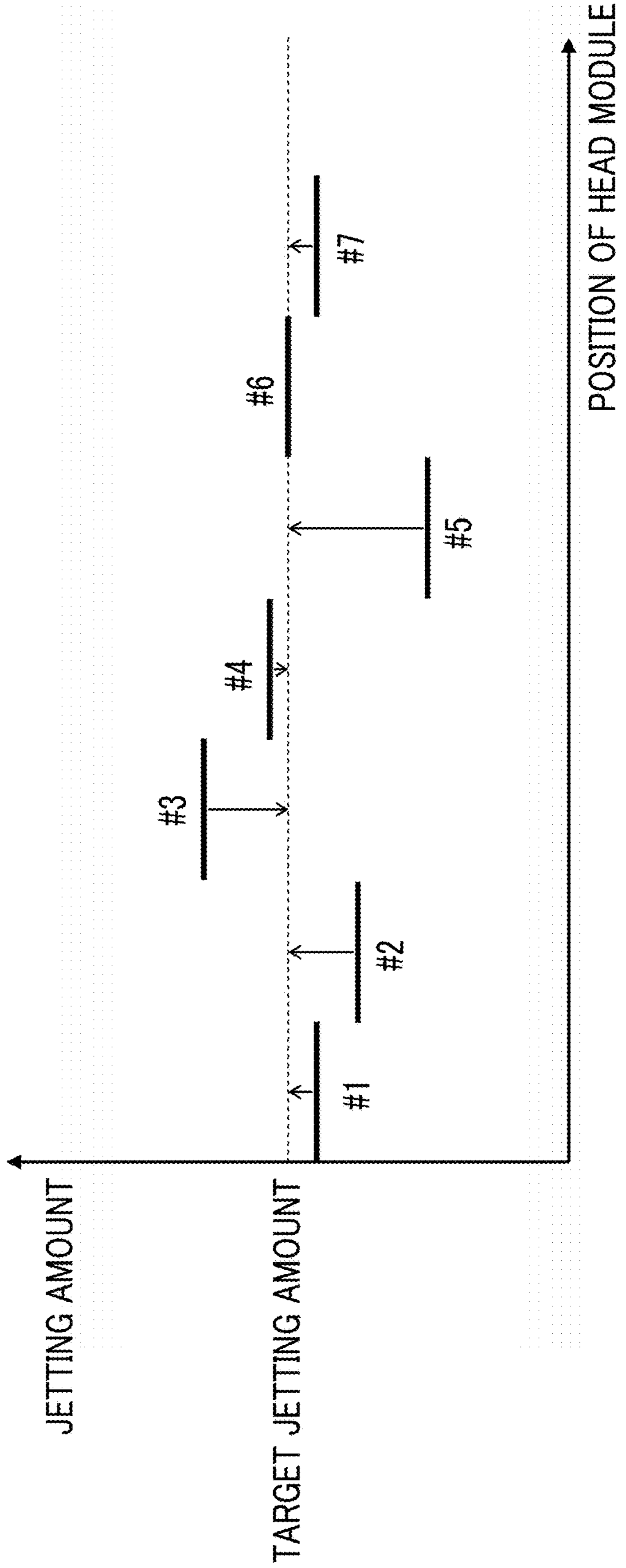
FIG. 7 is a conceptual diagram of a jetting characteristic for each module.

FIG. 7 is a conceptual diagram of the jetting characteristic for each module. In FIG. 7, a graph format is used to show a difference in the jetting amount in a case in which the driving voltage before adjustment using the voltage coefficient is supplied to the plurality of head modules 34. A horizontal axis represents a position of the head module 34. A vertical axis represents the jetting amount.

In the shipment inspection, the jetting amount is measured for each head module 34, and the voltage coefficient is derived for each head module 34 based on the result of the jetting amount measurement. In theory, the target jetting amount is realized in a case in which the driving voltage adjusted using the voltage coefficient of the shipment inspection value is applied.

Figure 8:
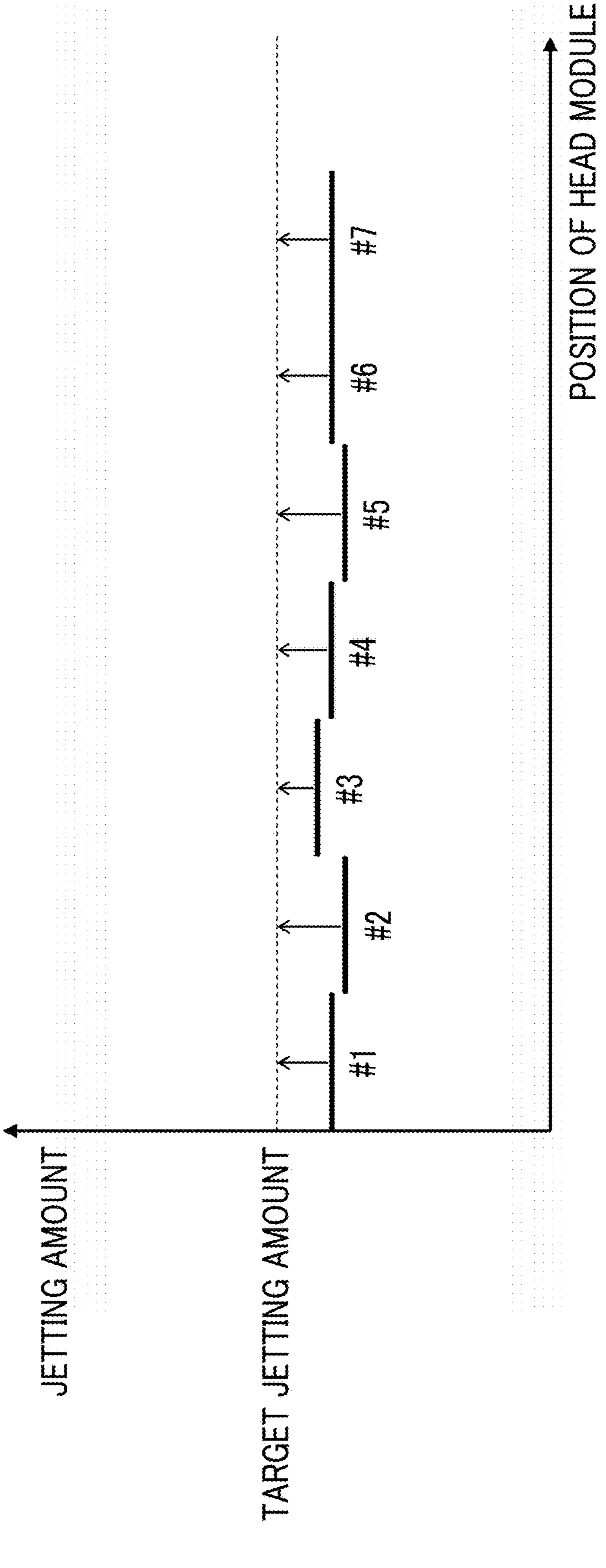
FIG. 8 is a conceptual diagram of the jetting characteristic of ink applied to printing for each head module.

FIG. 8 is a conceptual diagram of the jetting characteristic of the ink applied to printing for each head module. FIG. 8 shows an example of the jetting characteristic for each module in a case in which the ink applied to printing is different from the ink applied for the jetting amount measurement in the shipment inspection.

Even in a case in which the driving voltage adjusted using the voltage coefficient of the shipment inspection value is applied, the actual jetting amount for each head module 34 is different from the target jetting amount due to the different in the ink characteristic, such as the viscosity of the ink. Therefore, the voltage coefficient is corrected for each head module 34 based on the ink characteristic of the ink applied to printing, and the driving voltage is adjusted using the corrected voltage coefficient. As a result, the target jetting amount is realized for all the head modules 34.

Action and Effect of First Embodiment

The ink jet printing device 10 and the driving voltage adjustment method according to the first embodiment can obtain the following action and effect.

[1]

The voltage coefficient acquired as the shipment inspection value is corrected based on the ink characteristic in the ink applied to printing. The driving voltage adjusted using the corrected voltage coefficient is supplied to the ink jet head 32. As a result, the variation in the jetting amounts for each head module 34 due to the jetting characteristic of each head module 34 can be suppressed, and the density unevenness in the printed image can be suppressed.

[2]

The voltage coefficient is derived based on the electrical characteristic of the piezoelectric element and the mechanical characteristic of the piezoelectric element. As a result, it is possible to correct the voltage coefficient based on the ink characteristic even in a case in which it is difficult to measure the jetting amount.

[3]

The voltage coefficient is derived based on the measurement value of the component of the printed image. As a result, it is possible to correct the voltage coefficient based on the ink characteristic even in a case in which it is difficult to measure the jetting amount.

[4]

The ratio between the viscosity of the ink applied to printing and the viscosity of the ink applied to the shipment inspection is applied to the ink characteristic. As a result, the correction of the voltage coefficient based on the viscosity of the ink can be performed.

[5]

The rate of change of the voltage coefficient derived from the measurement result of the jetting amount measurement in the shipment inspection is applied to the ink characteristic. As a result, it is possible to correct the voltage coefficient based on the result of the jetting amount measurement.

Second Embodiment

[Configuration Example of Printing Control Unit]

Figure 9:
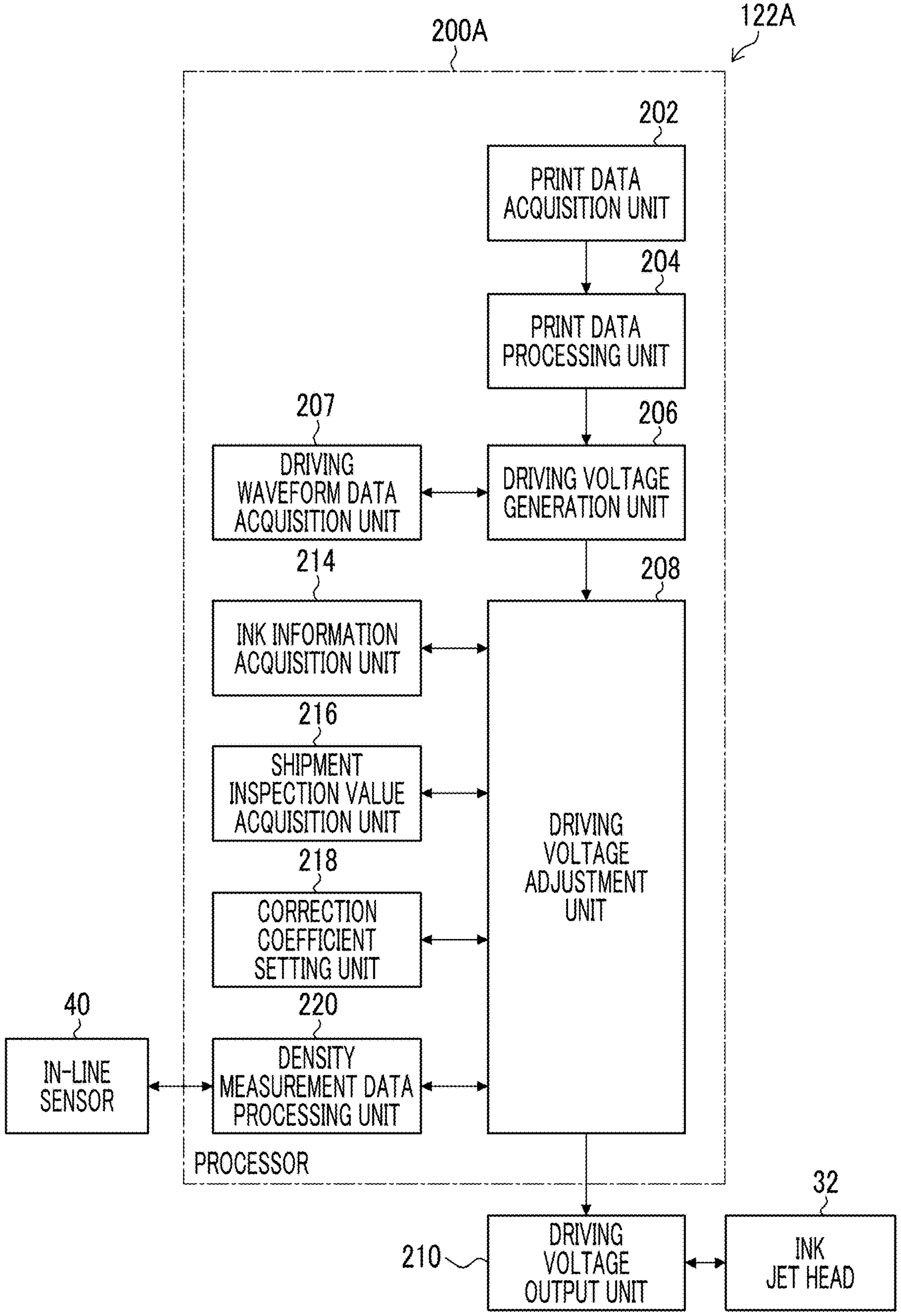
FIG. 9 is a functional block diagram of a printing control unit applied to an ink jet printing device according to a second embodiment.

FIG. 9 is a functional block diagram of a printing control unit applied to an ink jet printing device according to a second embodiment. The ink jet printing device according to the second embodiment performs the density measurement of the printed image using the driving voltage adjusted based on the voltage coefficient corresponding to the ink applied to printing, and corrects the voltage coefficient for each head module 34 based on the density measurement value of the printed image.

A processor 200A constituting a printing control unit 122A shown in FIG. 9 includes a density measurement data processing unit 220 added to the processor 200 shown in FIG. 4. The density measurement data processing unit 220 acquires the read data of the printed image for each head module 34 from the in-line sensor 40. The density measurement data processing unit 220 derives the density measurement value of the printed image for each head module 34 based on the read data of the printed image.

The correction coefficient setting unit 218 derives the voltage coefficient that realizes a defined target density value for each head module 34. An average value of the density measurement values in two or more head modules 34 can be applied to the target density value. The density measurement value in any one head module 34 may be applied to the target density value.

The density measurement data processing unit 220 may derive the correlation between the voltage coefficient and the density value based on the read data of a plurality of density measurement charts printed with different voltage coefficients. The correction coefficient setting unit 218 can derive the voltage coefficient corresponding to the target density value using the correlation between the voltage coefficient and the density value.

That is, the ink jet printing device according to the second embodiment derives the voltage coefficient subjected to the relative density adjustment, applies the voltage coefficient subjected to the relative density adjustment, and adjusts the driving voltage.

FIG. 10 is a table showing an example of a voltage coefficient applied to a driving voltage adjustment method according to the second embodiment. In the table shown in FIG. 10, the values in a column of the voltage coefficient of the shipment inspection value and the values in a column of the voltage coefficient of the correction coefficient addition are the same as those in the table shown in FIG. 5. Here, the description thereof will be omitted.

The correction coefficient setting unit 218 shown in FIG. 9 derives and sets a voltage coefficient c after the relative density adjustment shown in FIG. 10. The correlation between the voltage coefficient and the density value derived by irregularly increasing or decreasing the voltage coefficient for each head module 34 is applied to the voltage coefficient c shown in FIG. 9.

The correction coefficient setting unit 218 derives the voltage coefficient after the average value adjustment by multiplying the voltage coefficient c after the relative density adjustment for each head module 34 by the ratio between the average value of the voltage coefficients before the relative density adjustment and the average value of the voltage coefficients after the relative density adjustment. The voltage coefficient after the average value adjustment is represented by $c \times \{Avg(a*b)/Avg(c)\}$. It should be noted that Avg represents an average value of the values in parentheses for the plurality of head modules 34. A numerical value in a column of Average shown in FIG. 10 represents an average value of the voltage coefficients in the plurality of head modules 34.

As a result, the voltage coefficient after the average value adjustment is derived in which the ratio between the voltage coefficient a in the shipment inspection value and the voltage coefficient in the ink jet printing device 10 applied to printing is maintained.

Figure 11:
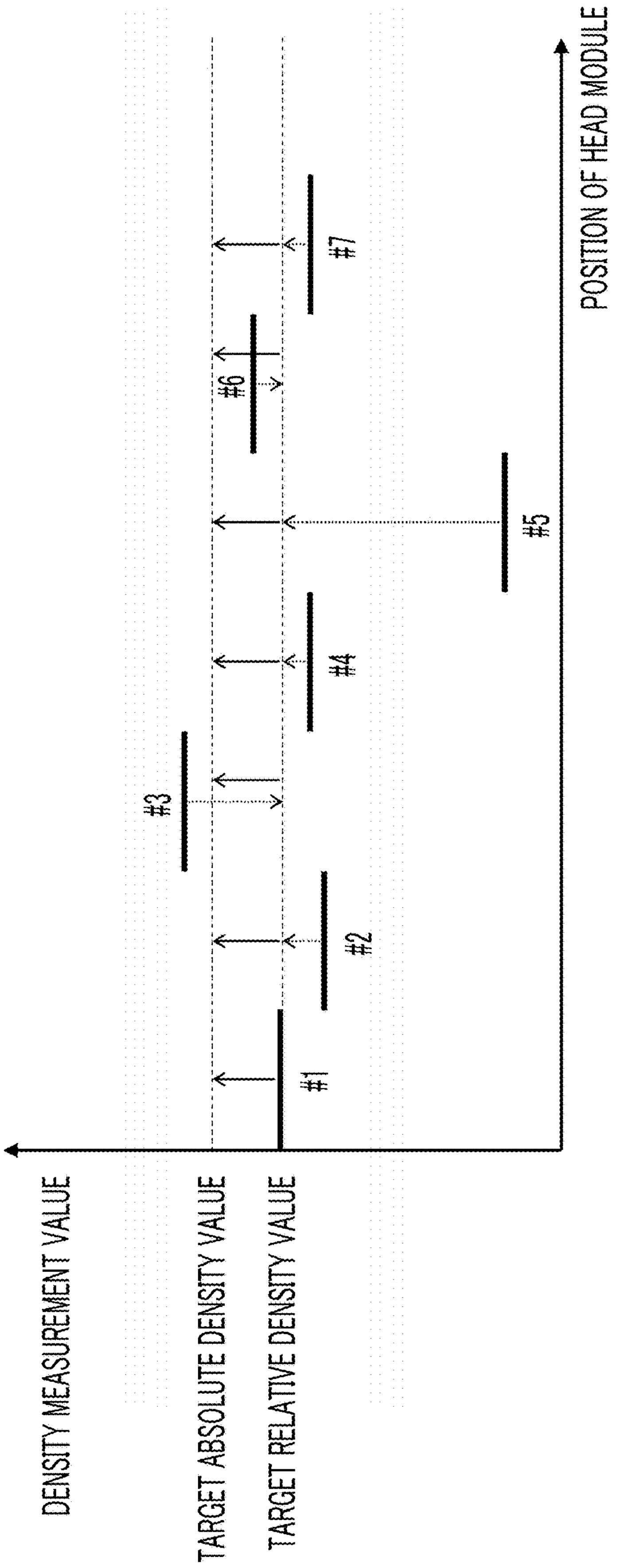
FIG. 11 is a conceptual diagram of relative density adjustment and average value adjustment.

FIG. 11 is a conceptual diagram of the relative density adjustment and the average value adjustment. In FIG. 11, the density measurement value for each head module 34 is schematically shown using a graph format. A horizontal axis of the graph shown in FIG. 11 represents the position of the head module 34. A vertical axis represents the density measurement value.

The density measurement value for each head module 34 is different from the target density value. In a case in which the ink jet head 32 is driven using the driving voltage adjusted using the voltage coefficient after the relative density adjustment, the density measurement value of the printed image for each head module 34 is matched to a target relative density value. A broken arrow line given to each head module 34 schematically represents the relative density adjustment.

Further, in a case in which the ink jet head 32 is driven using the driving voltage adjusted using the voltage coefficient after the average value adjustment, the density measurement value of the printed image for each head module 34 is matched to a target absolute density value. A solid arrow line given to each head module 34 schematically represents the relative density adjustment.

Figure 12:
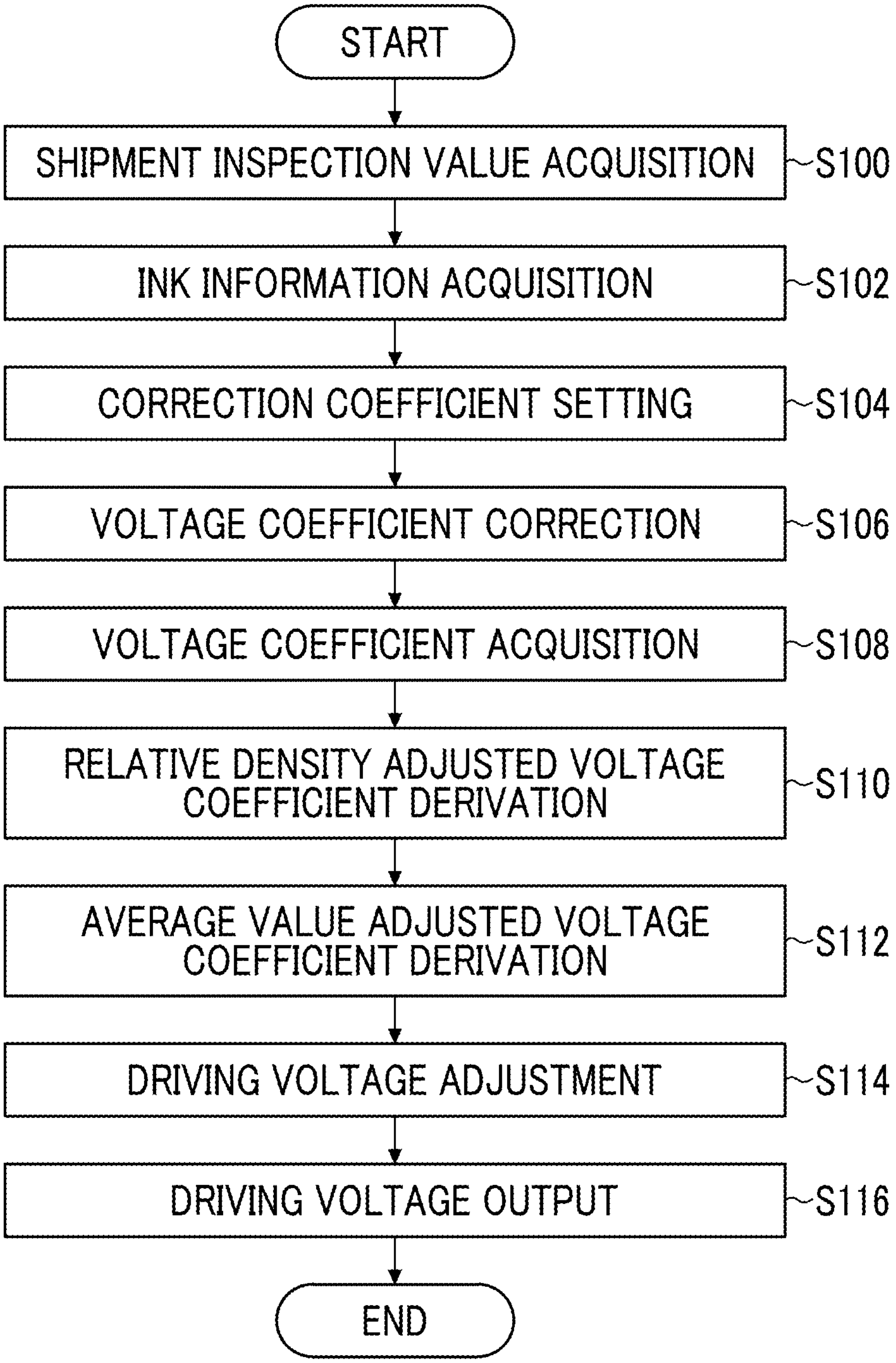
FIG. 12 is a flowchart showing a procedure of the driving voltage adjustment method according to the second embodiment.

FIG. 12 is a flowchart showing a procedure of the driving voltage adjustment method according to the second embodiment. Shipment inspection value acquisition step S100, ink information acquisition step S102, correction coefficient setting step S104, and voltage coefficient correction step S106 shown in FIG. 12 are the same as the steps from shipment inspection value acquisition step S10 to voltage coefficient correction step S16 shown in FIG. 6, respectively. Here, the description thereof will be omitted. After voltage coefficient correction step S106, the processing proceeds to density measurement value acquisition step S108.

In density measurement value acquisition step S108, the density measurement data processing unit 220 shown in FIG. 9 acquires the density measurement value for each head module 34 to which the driving voltage to which the voltage coefficient before the relative density adjustment is applied is applied. After density measurement value acquisition step S108, the processing proceeds to relative density adjusted voltage coefficient derivation step S110.

In relative density adjusted voltage coefficient derivation step S110, the correction coefficient setting unit 218 derives and sets the voltage coefficient c after the relative density adjustment based on the density measurement value acquired in density measurement value acquisition step S108. After relative density adjusted voltage coefficient derivation step S110, the processing proceeds to average value adjusted voltage coefficient derivation step S112.

In average value adjusted voltage coefficient derivation step S112, the correction coefficient setting unit 218 derives and sets the voltage coefficient after the average value adjustment shown in FIG. 10. After average value adjusted voltage coefficient derivation step S112, the processing proceeds to driving voltage adjustment step S114 and driving voltage output step S116.

Driving voltage adjustment step S114 and driving voltage output step S116 are the same as driving voltage adjustment step S18 and driving voltage output step S20 shown in FIG. 6, respectively. Here, the description thereof will be omitted.

It should be noted that the voltage coefficient after the relative density adjustment described in the embodiment is an example of a second voltage coefficient. The voltage coefficient after the average value adjustment described in the embodiment is an example of a third voltage coefficient.

Modification Example of Second Embodiment

It is necessary to adjust the driving voltage corresponding to the target density value due to the difference in paper P. Therefore, for each combination of the paper P applied to printing and the ink applied to printing, the voltage coefficient based on the density measurement value may be derived, paper information including the type of the paper P may be acquired, and the voltage coefficient may be set in accordance with the combination of the ink and the paper P. It should be noted that the paper P described in the embodiment is an example of a medium.

Even with the same type of the paper P, a variation in lots can be present. Therefore, for each lot of the paper P, the voltage coefficient based on the density measurement value is derived in advance. Lot information of the paper P can be acquired as the paper information, and the voltage coefficient for each lot can be used to adjust the driving voltage, and the density unevenness of the printed image due to the variation in the lots of the paper P can be suppressed.

Action and Effect of Second Embodiment

The driving voltage adjustment method according to the second embodiment can obtain the following action and effect.

[1]

The voltage coefficient c after the relative density adjustment is derived, and the driving voltage is adjusted using the voltage coefficient c after the relative density adjustment. As a result, the printing density among the head modules 34 is made uniform. It should be noted that the printing density represents the density of the printed image, which is printed using the head module 34.

Figure 13:
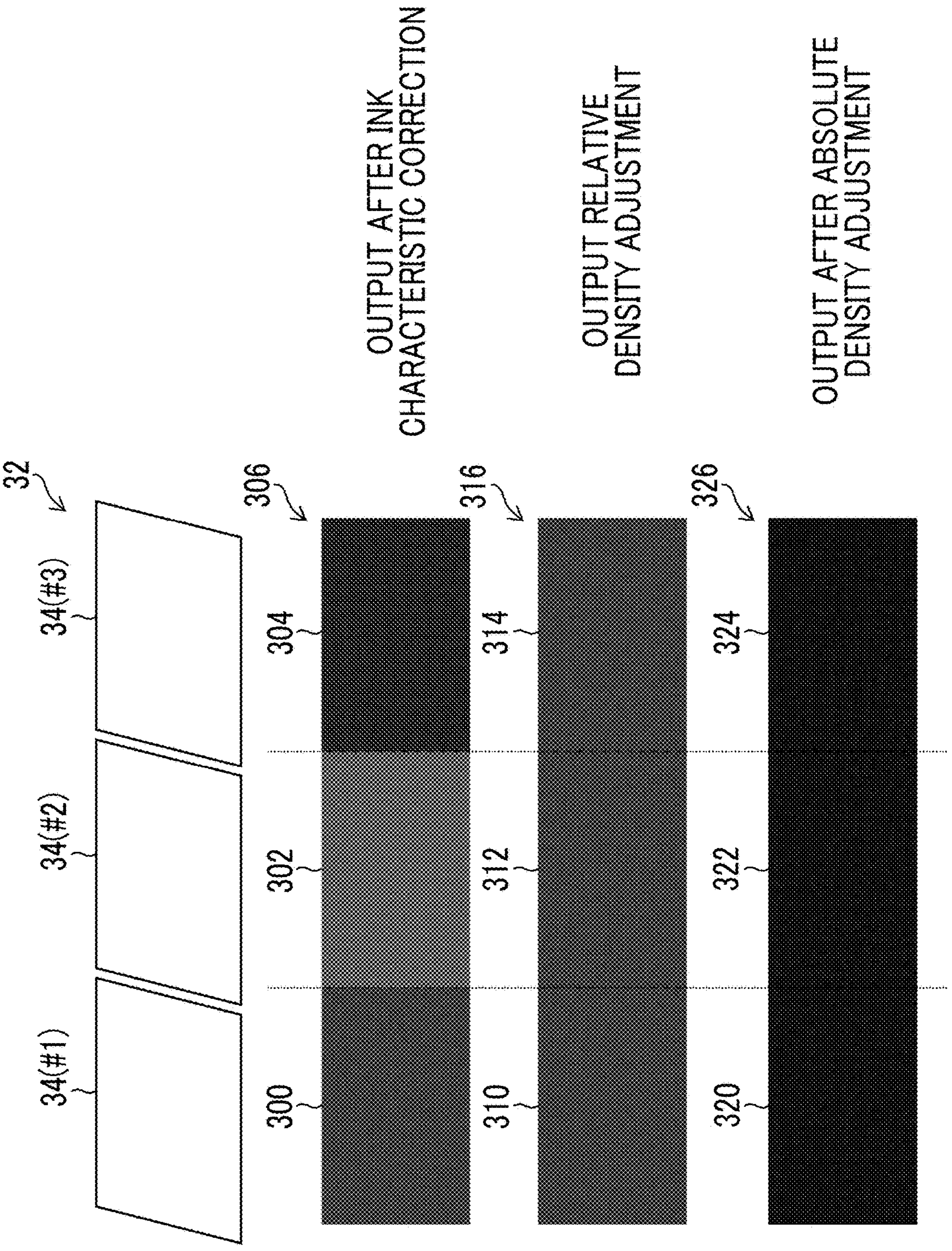
FIG. 13 is an explanatory diagram of an action and an effect of the second embodiment.

FIG. 13 is an explanatory diagram of the action and the effect of the second embodiment. Three head modules 34 shown in 13 can be, for example, the head modules 34 described as Module #1, Module #2, and Module #3 in the table shown in FIG. 10.

Each of a printed image 300, a printed image 302, and a printed image 304 is printed by supplying the driving voltage adjusted by applying the voltage coefficient of the shipment inspection value to each head module 34. In a printed image 306 including the printed image 300, the printed image 302, and the printed image 304, the density unevenness due to the ink characteristic occurs.

On the other hand, a printed image 316 including a printed image 310, a printed image 312, and a printed image 314 is printed by supplying the driving voltage adjusted by applying the voltage coefficient after the relative density adjustment to each head module 34. In the printed image 316 including the printed image 310, the printed image 312, and the printed image 314, the density unevenness due to the characteristic of the head module 34 is suppressed.

[2]

The voltage coefficient after the average value adjustment is derived from the voltage coefficient after the relative density adjustment, and the driving voltage is adjusted using the voltage coefficient after the average value adjustment. As a result, the printing density of each head module 34 is set to the target absolute density.

A printed image 320, a printed image 322, and a printed image 324 shown in FIG. 13 are printed by supplying the driving voltage adjusted by applying the voltage coefficient after the average value adjustment to each head module 34. In a printed image 326 including the printed image 320, the printed image 322, and the printed image 324, the absolute target density is realized.

[Modification Example of Ink Jet Printing Device]

An aspect using a pretreatment liquid can be applied to the ink jet printing device 10 shown in FIG. 1. Examples of the pretreatment liquid include a precoat liquid that aggregates or insolubilizes a coloring material contained in the ink. For example, the ink jet printing device 10 can comprise a precoat application device that applies the precoat liquid and a precoat liquid drying device that dries the paper P coated with the precoat liquid.

In the printed image, the density unevenness due to the variation in the application of the precoat liquid can occur. The driving voltage is adjusted using the voltage coefficient after the relative density adjustment. As a result, the printing density of each head module 34 is made uniform.

The continuous paper can be applied to the paper P in the ink jet printing device 10 shown in FIG. 1. For example, a roll-to-roll form can be applied to the transport form of the paper P. In the roll-to-roll form, a load in a case in which the paper P for ink jet printing is used is large, and the occurrence of the density unevenness of the printed image is remarkable. The adjustment of the driving voltage by applying the voltage coefficient based on the density measurement value of the paper P in accordance with the paper information can suppress the density unevenness of the printed image.

[Example of Application to Head Device]

The printing control unit 122 shown in FIGS. 3 and 4 can be combined with the ink jet head 32 shown in FIGS. 1 and 2 to constitute the head device, which is the external device of the ink jet printing device 10.

[Example of Application to Program]

A program corresponding to the ink jet printing device 10 and the driving voltage adjustment method can be configured. That is, it is possible to constitute the program that causes the computer to realize the functions of various processing units shown in FIGS. 3 and 4 and each step shown in FIGS. 6 and 11.

Regarding Terms

The term printing device is synonymous with terms, such as a printing machine, a printer, a typing device, an image recording device, an image forming device, an image output device, and a drawing device. The image is interpreted in a broad sense, and also includes a color image, a monochrome image, a single color image, a gradation image, a uniform density image, and the like.

The term printing includes concepts of terms, such as recording the image, forming the image, typing, drawing, and printing. The term device can include the concept of a system.

The image is not limited to a photographic image, and is used as a collective term including a design, a text, a symbol, a line drawing, a mosaic pattern, a color-coding pattern, other various patterns, and an appropriate combination thereof. In addition, the term image can include the meaning of an image signal and image data that represents the image.

In the embodiments of the present invention described above, the configuration requirements can be appropriately changed, added, or deleted without departing from the spirit of the present invention. The present invention is not limited to the embodiments described above, and various modifications can be made by a person having ordinary knowledge in the art within the technical idea of the present invention. In addition, the embodiments, the modification example, and the application example may be appropriately combined and performed.

EXPLANATION OF REFERENCES

10: ink jet printing device
20: transport device
22: jetting drum
23: gripper
24: paper feed drum
25: gripper
26: paper pressing roller
28: paper ejection drum
29: gripper
30: jetting device
32: ink jet head
32C: ink jet head
32M: ink jet head
32Y: ink jet head
32K: ink jet head
33: nozzle surface
34: head module
36: support frame
38: flexible substrate
39: dummy plate
39A: surface
40: in-line sensor
100: processor
102: memory
104: communication interface
106: host computer
108: system control unit

110: program memory
112: parameter memory
114: data memory
120: transport control unit
122: printing control unit
122A: printing control unit
124: read data processing unit
130: input device
132: display
200: processor
200A: processor
202: print data acquisition unit
204: print data processing unit
206: driving voltage generation unit
207: driving waveform data acquisition unit
208: driving voltage adjustment unit
210: driving voltage output unit
214: ink information acquisition unit
216: shipment inspection value acquisition unit
218: correction coefficient setting unit
220: density measurement data processing unit
300: printed image
302: printed image
304: printed image
306: printed image
310: printed image
312: printed image
314: printed image
316: printed image
320: printed image
322: printed image
324: printed image
326: printed image
S10 to S20: each step of driving voltage adjustment method
S100 to S116: each step of driving voltage adjustment method

What is claimed is:

1. A head device comprising:

an ink jet head including a plurality of head modules; and a driving voltage supply device that includes one or more processors and supplies a driving voltage to the ink jet head, the driving voltage corresponding to a target jetting amount for each head module, wherein the processor is configured to:

acquire a module characteristic from one or more memories, the module characteristic representing an initial voltage coefficient associated with each head module;

acquire an ink characteristic from the one or more memories, the ink characteristic representing a characteristic of ink applied to printing using the ink jet head, acquire a jetting amount for each head module from the one or more memories, the jetting amount being measured by applying defined ink, derive a first voltage coefficient for adjusting the driving voltage based on the module characteristic and the ink characteristic, the first voltage coefficient being derived based on the jetting amount for each head module, and adjust the driving voltage supplied to the ink jet head by applying the first voltage coefficient for each head module.

2. The head device according to claim 1, wherein the processor acquires a density measurement value of a printed image, which is printed by applying the driving voltage adjusted using the first voltage coefficient, for each head module, derives a second voltage coefficient for adjusting a driving voltage corresponding to a target density value for each head module based on a correlation between the initial voltage coefficient and a density value of the printed image, and adjusts the driving voltage supplied to the ink jet head by applying the second voltage coefficient for each head module.

3. The head device according to claim 2, wherein, in a case in which the second voltage coefficient for each head module is denoted by c, an average value of the first voltage coefficients of the plurality of head modules is denoted by Avg(a*b), and an average value of the second voltage coefficients of the plurality of head modules is denoted by Avg(c), the processor derives a third voltage coefficient represented by $c\times\{Avg(a*b)/Avg(c)\}$ for each head module, and adjusts the driving voltage supplied to the ink jet head by applying the third voltage coefficient for each head module.

4. The head device according to claim 3, wherein the processor acquires information on a medium applied to printing, and corrects the third voltage coefficient in accordance with the acquired information on the medium.

5. The head device according to claim 1, wherein the initial voltage coefficient is a voltage coefficient applied to adjustment of the driving voltage corresponding to the target jetting amount in a case in which the defined ink is applied.

6. The head device according to claim 5, wherein the initial voltage coefficient is derived based on a result of a measurement of a jetting amount for each head module, which is performed by using the ink applied to printing.

7. The head device according to claim 5, wherein the first voltage coefficient is derived by correcting the initial voltage coefficient.

8. The head device according to claim 1, wherein the processor acquires, as the ink characteristic, viscosity of the ink applied to printing.

9. The head device according to claim 1, wherein the processor acquires, as the ink characteristic, a ratio between a voltage coefficient derived based on a result of measurement of a jetting amount of the ink applied to printing and a voltage coefficient derived based on the result of measurement of the jetting amount of the defined ink.

10. An ink jet printing device comprising:

an ink jet head including a plurality of head modules; and a driving voltage supply device that includes one or more processors and supplies a driving voltage to the ink jet head, the driving voltage corresponding to a target jetting amount for each head module, wherein the processor is configured to:

acquire a module characteristic from one or more memories, the module characteristic representing an initial voltage coefficient associated with each head module, acquire an ink characteristic from the one or more memories, the ink characteristic representing a characteristic of ink applied to printing using the ink jet head, acquire a jetting amount for each head module from the one or more memories, the jetting amount being measured by applying defined ink, derive a first voltage coefficient for adjusting the driving voltage based on the module characteristic and the ink characteristic, the first voltage coefficient being derived based on the jetting amount for each head module, and adjust the driving voltage supplied to the ink jet head by applying the first voltage coefficient for each head module.

11. A driving voltage adjustment method of adjusting a driving voltage applied to an ink jet head including a plurality of head modules, the driving voltage corresponding to a target jetting amount for each head module, the method comprising:

acquiring a module characteristic from one or more memories, the module characteristic representing an initial voltage coefficient associated with each head module;

acquiring an ink characteristic from the one or more memories, the ink characteristic representing a characteristic of ink applied to printing using the ink jet head;

acquiring a jetting amount for each head module from the one or more memories, the jetting amount being measured by applying defined ink, deriving a first voltage coefficient for adjusting the driving voltage based on the module characteristic and the ink characteristic, the first voltage coefficient being derived based on the jetting amount for each head module; and adjusting the driving voltage supplied to the ink jet head by applying the first voltage coefficient for each head module.

* * * * *